United States Patent
Song et al.

(10) Patent No.: US 10,284,396 B2
(45) Date of Patent: May 7, 2019

(54) SEMICONDUCTOR DEVICE

(71) Applicant: SK hynix Inc., Icheon-si, Gyeonggi-do (KR)

(72) Inventors: Jun Yong Song, Seoul (KR); Jeong Kyoum Kim, Icheon-si Gyeonggi-do (KR); Hyung Soo Kim, Hwaseong-si Gyeonggi-do (KR); Han Kyu Chi, Seoul (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 15/802,922

(22) Filed: Nov. 3, 2017

(65) Prior Publication Data

US 2018/0262372 A1    Sep. 13, 2018

(30) Foreign Application Priority Data

Mar. 8, 2017    (KR) ........................ 10-2017-0029569

(51) Int. Cl.
*H03H 7/30* (2006.01)
*H03H 7/40* (2006.01)
*H03K 5/159* (2006.01)
*H04L 25/03* (2006.01)
*H04W 72/08* (2009.01)
*H04B 1/10* (2006.01)
*H04B 1/12* (2006.01)
*H04B 1/7097* (2011.01)
*H04B 7/08* (2006.01)

(52) U.S. Cl.
CPC ........ *H04L 25/0328* (2013.01); *H04B 1/109* (2013.01); *H04B 1/126* (2013.01); *H04B 1/7097* (2013.01); *H04B 7/0862* (2013.01); *H04W 72/082* (2013.01); *Y02D 70/00* (2018.01); *Y02D 70/40* (2018.01)

(58) Field of Classification Search
CPC ........ H04L 25/0328; H04L 25/03019; H04W 72/082; H04B 1/109; H04B 1/126; H04B 1/7097; H04B 7/0862
USPC ........................................ 375/232, 233, 234
See application file for complete search history.

(56) References Cited

U.S. PATENT DOCUMENTS 8,976,855 B2    3/2015 Xu et al.
2009/0252215 A1*  10/2009 Bulzacchelli ..... H04L 25/03019
                                                   375/233

\* cited by examiner

*Primary Examiner* — Phuong Phu
(74) *Attorney, Agent, or Firm* — William Park & Associates Ltd.

(57) ABSTRACT

A symbol interference cancellation circuit may be provided. The symbol interference cancellation circuit may include an interference cancellation circuit configured for generating an interference-cancelled signal based on weight application signals, sampling output signals, and a clock signal.

18 Claims, 8 Drawing Sheets

SEMICONDUCTOR DEVICE

CROSS-REFERENCES TO RELATED APPLICATION

The present application claims priority under 35 U.S.C. § 119(a) to Korean application number 10-2017-0029569, filed on Mar. 8, 2017, in the Korean Intellectual Property Office, which is incorporated herein by reference in its entirety.

BACKGROUND

1. Technical Field

Various embodiments may generally relate to a semiconductor device, and, more particularly, to a symbol interference cancellation circuit.

2. Related Art

A semiconductor device may include a semiconductor integrated circuit. A semiconductor integrated circuit is a circuit which transmits and receives electrical signals.

As the speed of a semiconductor integrated circuit increases, a speed at which signals are transmitted and received is also increases.

As the transmission and reception speed of a signal increases, interference between signal symbols increases. Such an increase in interference causes a problem in accurate and fast transmission and reception of a signal.

SUMMARY

In an embodiment, a symbol interference cancellation circuit may be provided. The symbol interference cancellation circuit may include an interference cancellation circuit configured for generating an interference-cancelled signal which may be cancelled with post cursor components of an input signal, based on a first weight application signal, a second weight application signal, a first sampling output signal, a second sampling output signal, a first clock signal and a second clock signal. The symbol interference cancellation circuit may include a first sampling circuit configured for generating the first sampling output signal based on the first clock signal and the interference-cancelled signal. The symbol interference cancellation circuit may include a second sampling circuit configured for generating the second sampling output signal based on the second clock signal and the interference-cancelled signal.

In an embodiment, a symbol interference cancellation circuit is may be provided. The symbol interference cancellation circuit may include a first interference cancellation circuit configured for generating a first interference-cancelled signal which may be cancelled with a first post cursor component, a second post cursor component, a third post cursor component, and a fourth post cursor component, based on a first weight application signal, a second weight application signal, a third weight application signal, a fourth weight application signal, a first sampling output signal, a second sampling output signal, a third sampling output signal, a fourth sampling output signal, a third clock signal, a fourth clock signal, and an input signal. The symbol interference cancellation circuit may include a second interference cancellation circuit configured for generating a second interference-cancelled signal which is cancelled with a first post cursor component, a second post cursor component, a third post cursor component, and a fourth post cursor component, based on the first weight application signal, the second weight application signal, the third weight application signal, the fourth weight application signal, the first sampling output signal, the second sampling output signal, the third sampling output signal, the fourth sampling output signal, a first clock signal, a second clock signal, and the input signal. The symbol interference cancellation circuit may include a first sampling circuit configured for generating the first sampling output signal based on the first interference-cancelled signal and the first clock signal. The symbol interference cancellation circuit is may include a second sampling circuit configured for generating the second sampling output signal based on the first interference-cancelled signal and the second clock signal. The symbol interference cancellation circuit a third sampling circuit configured for generating the third sampling output signal based on the second interference-cancelled signal and the third clock signal. The symbol interference cancellation circuit may include a fourth sampling circuit configured for generating the fourth sampling output signal based on the second interference-cancelled signal and the fourth clock signal.

In an embodiment, a symbol interference cancellation circuit may be provided. The symbol interference cancellation circuit may include an interference cancellation circuit configured for generating an interference-cancelled signal which may be cancelled with post cursor components of an input signal, based on different combinations of weight application signals and sampling output signals, when a first clock signal transitions to a first specified level and when a second clock signal transitions to a second specified level.

DETAILED DESCRIPTION

Hereinafter, a symbol interference cancellation circuit will be described below with reference to the accompanying drawings through various examples of embodiments. In an embodiment, for example, a semiconductor device may include a semiconductor integrated circuit which may include a symbol interference cancellation circuit.

Figure 1:
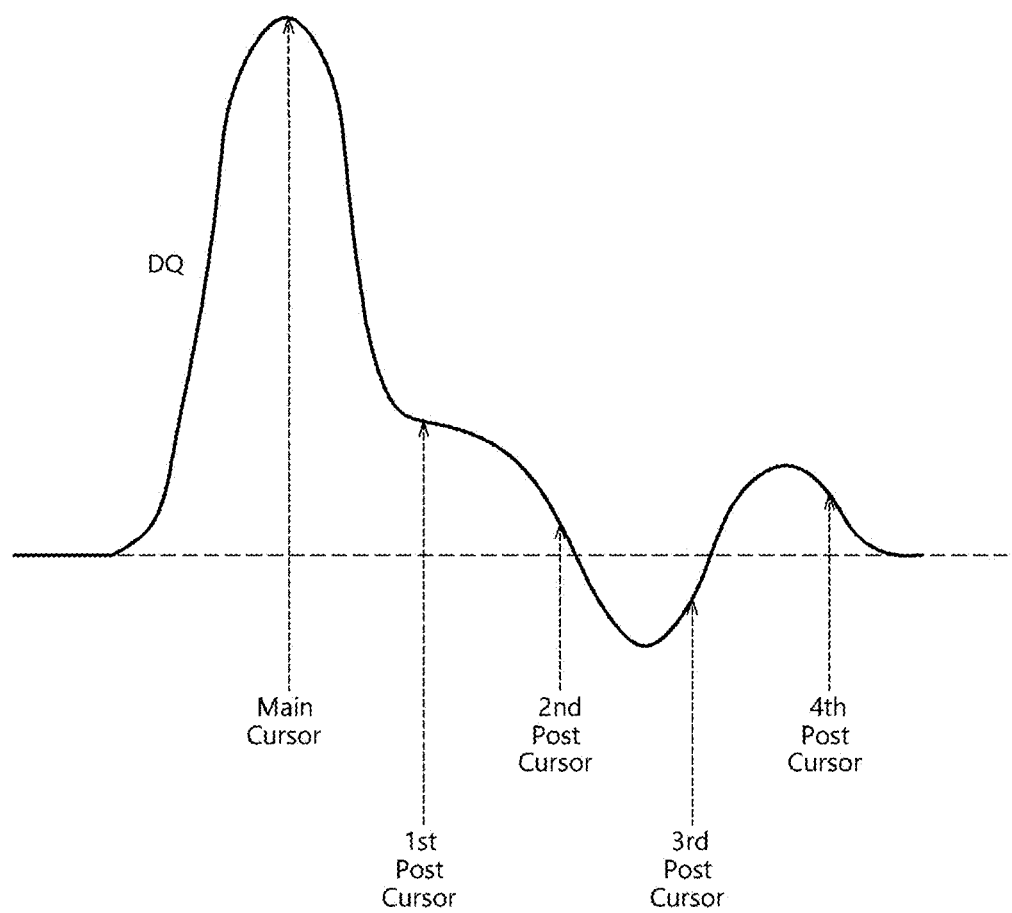
FIG. 1 is a representation of an example of a timing diagram to assist in the explanation of the operation of a symbol interference cancellation circuit in accordance with an embodiment.

Embodiments may generally relate to technologies capable of cancelling interferences between symbols illustrated in FIG. 1.

Symbol interference cancellation circuits according to the embodiments may be inputted with an input signal DQ illustrated in FIG. 1.

The main cursor component of the input signal DQ illustrated in FIG. 1 is a meaningful component of the input signal DQ. Also, first to fourth post cursor components of the input signal DQ are meaningless components of the input signal DQ. The first to fourth post cursor components may be generated due to interferences between the symbols of the input signal DQ.

The symbol interference cancellation circuits according to the embodiments may be technologies for cancelling the first to fourth post cursor components. Further, the logic levels of the signals may be different from or the opposite of those described. For example, a signal described as having a logic "high" level may alternatively have a logic "low" level, and a signal described as having a logic "low" level may alternatively have a logic "high" level. For reference, an embodiment including additional components may be provided. Furthermore, a logic high or logic low configuration indicating a state of a signal or circuit may be changed depending on embodiments. Furthermore, the configuration of a transistor required for implementing the same function may be modified. That is, the configuration of the PMOS transistor and the configuration of the NMOS transistor may be replaced with each other, depending on a specific situation. If necessary, various transistors may be applied to implement the configurations.

Figure 2:
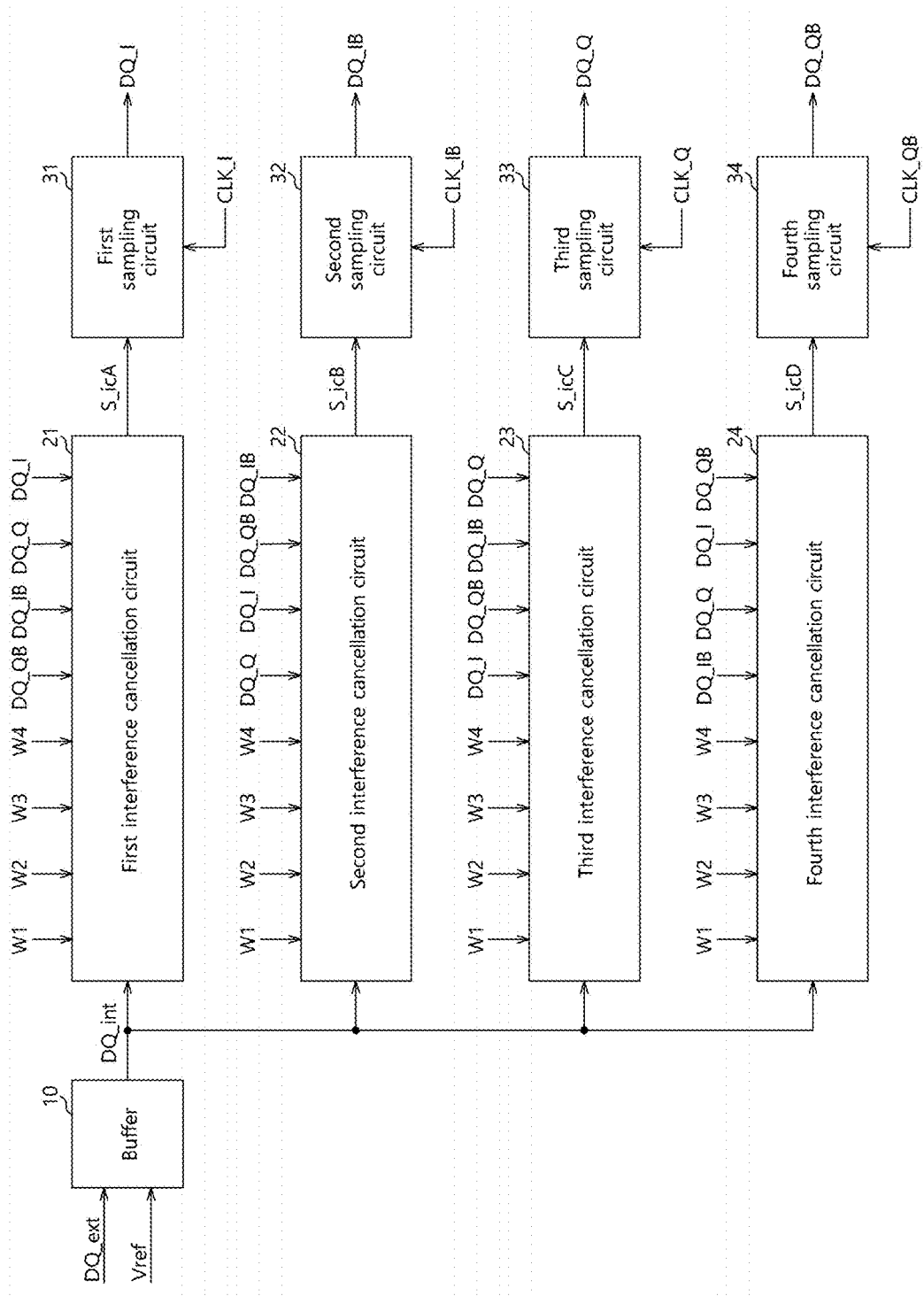
FIG. 2 is a configuration diagram illustrating a representation of an example of a symbol interference cancellation circuit in accordance an embodiment.

As illustrated in FIG. 2, a symbol interference cancellation circuit in accordance with an embodiment may include a buffer 10, a first interference cancellation circuit 21, a second interference cancellation circuit 22, a third interference cancellation circuit 23, a fourth interference cancellation circuit 24, a first sampling circuit 31, a second sampling circuit 32, a third sampling circuit 33, and a fourth sampling circuit 34. For reference, an embodiment including additional components may be provided. Furthermore, a logic high or logic low configuration indicating a state of a signal or circuit may be changed depending on embodiments. Furthermore, the configuration of a transistor required for implementing the same function may be modified. That is, the configuration of the PMOS transistor and the configuration of the NMOS transistor may be replaced with each other, depending on a specific situation. If necessary, various transistors may be applied to implement the configurations.

The buffer 10 may buffer an external input signal DQ_ext, and output an internal input signal DQ_int. For example, the buffer 10 may determine the voltage level of the internal input signal DQ_int by determining the voltage level of the external input signal DQ_ext based on the voltage level of a reference voltage Vref, and output the internal input signal DQ_int of which voltage level is determined.

The first interference cancellation circuit 21 may generate a first interference-cancelled signal S_icA which is cancelled with first to fourth post cursor components in synchronization with the sampling timing of the first sampling circuit 31 in response to first to fourth weight application signals W1, W2, W3, and W4, first to fourth sampling output signals DQ_I, DQ_IB, DQ_Q, and DQ_QB and the internal input signal DQ_int. The first interference cancellation circuit 21 may generate the first interference-cancelled signal S_icA by canceling the first to fourth post cursor components of the internal input signal DQ_int through using the second to fourth sampling output signals DQ_IB, DQ_Q, and DQ_QB which have phase differences of 90 degrees based on the sampling timing of the first sampling circuit 31, that is, the first sampling output signal DQ_I. For example, the first interference cancellation circuit 21 may cancel the first post cursor component according to the sampling timing of the first sampling circuit 31 in response to the internal input signal DQ_int, the first weight application signal W1 and the fourth sampling output signal DQ_QB. The first interference cancellation circuit 21 may cancel the second post cursor component according to the sampling timing of the first sampling circuit 31 in response to the internal input signal DQ_int, the second weight application signal W2 and the second sampling output signal DQ_IB. The first interference cancellation circuit 21 may cancel the third post cursor component according to the sampling timing of the first sampling circuit 31 in response to the internal input signal DQ_int, the third weight application signal W3 and the third sampling output signal DQ_Q. The first interference cancellation circuit 21 may cancel the fourth post cursor component according to the sampling timing of the first sampling circuit 31 in response to the internal input signal DQ_int, the fourth weight application signal W4 and the first sampling output signal DQ_I. In this way, the first interference cancellation circuit 21 may generate the first interference-cancelled signal S_icA which is cancelled with the first to fourth post cursor components. The respective voltage levels of the first to fourth weight application signals W1, W2, W3, and W4 may include information on amounts of cursor components to be cancelled, and the first to fourth weight application signals W1, W2, W3, and W4 may be outputted through a controller or a storage circuit which stores information on amounts of cursor components.

The second interference cancellation circuit 22 may generate a second interference-cancelled signal S_icB which is cancelled with first to fourth post cursor components in synchronization with the sampling timing of the second sampling circuit 32 in response to the first to fourth weight application signals W1, W2, W3, and W4, the first to fourth sampling output signals DQ_I, DQ_IB, DQ_Q and DQ_QB and the internal input signal DQ_int. The second interference cancellation circuit 22 may generate the second interference-cancelled signal S_icB by canceling the first to fourth post cursor components of the internal input signal DQ_int through using the first sampling output signal DQ_I and the third and fourth sampling output signals DQ_Q and DQ_QB which have phase differences of 90 degrees based on the sampling timing of the second sampling circuit 32, that is, the second sampling output signal DQ_IB. For example, the second interference cancellation circuit 22 may cancel the first post cursor component according to the sampling timing of the second sampling circuit 32 in response to the internal input signal DQ_int, the first weight application signal W1 and the third sampling output signal DQ_Q. The second interference cancellation circuit 22 may cancel the second post cursor component according to the sampling timing of the second sampling circuit 32 in response to the internal input signal DQ_int, the second weight application signal W2 and the first sampling output signal DQ_I. The second interference cancellation circuit 22 may cancel the third post cursor component according to the sampling timing of the second sampling circuit 32 in response to the internal input signal DQ_int, the third weight application signal W3, and the fourth sampling output signal DQ_QB. The second interference cancellation circuit 22 may cancel the fourth post cursor component according to the sampling timing of the second sampling to circuit 32 in response to the internal input signal DQ_int, the fourth weight application signal W4, and the second sampling output signal DQ_IB. In this way, the second interference cancellation circuit 22 may generate the second interference-cancelled signal S_icB which is cancelled with the first to fourth post cursor components.

The third interference cancellation circuit 23 may generate a third interference-cancelled signal S_icC which is cancelled with first to fourth post cursor components in synchronization with the sampling timing of the third sampling circuit 33 in response to the first to fourth weight application signals W1, W2, W3, and W4, the first to fourth sampling output signals DQ_I, DQ_IB, DQ_Q and DQ_QB and the internal input signal DQ_int. The third interference cancellation circuit 23 may generate the third interference-cancelled signal S_icC by canceling the first to fourth post cursor components of the internal input signal DQ_int through using the first and second sampling output signals DQ_I and DQ_IB and the fourth sampling output signal DQ_QB which have phase differences of 90 degrees based on the sampling timing of the third sampling circuit 33, that is, the third sampling output signal DQ_Q. For example, the third interference cancellation circuit 23 may cancel the first post cursor component according to the sampling timing of the third sampling circuit 33 in response to the internal input signal DQ_int, the first weight application signal W1, and the first sampling output signal DQ_I. The third interference cancellation circuit 23 may cancel the second post cursor component according to the sampling timing of the third sampling circuit 33 in response to the internal input signal DQ_int, the second weight application signal W2, and the fourth sampling output signal DQ_QB. The third interference cancellation circuit 23 may cancel the third post cursor component according to the sampling timing of the third sampling circuit 33 in response to the internal input signal DQ_int, the third weight application signal W3, and the second sampling output signal DQ_IB. The third interference cancellation circuit 23 may cancel the fourth post cursor component according to the sampling timing of the third sampling circuit 33 in response to the internal input signal DQ_int, the fourth weight application signal W4, and the third sampling output signal DQ_Q. In this way, the third interference cancellation circuit 23 may generate the third interference-cancelled signal S_icC which is cancelled with the first to fourth post cursor components.

The fourth interference cancellation circuit 24 may generate a fourth interference-cancelled signal S_icD which is cancelled with first to fourth post cursor components in synchronization with the sampling timing of the fourth sampling circuit 34 in response to the first to fourth weight application signals W1, W2, W3, and W4, the first to fourth sampling output signals DQ_I, DQ_IB, DQ_Q and DQ_QB and the internal input signal DQ_int. The fourth interference cancellation circuit 24 may generate the fourth interference-cancelled signal S_icD by canceling the first to fourth post cursor components of the internal input signal DQ_int through using the first to third sampling output signals DQ_I, DQ_IB and DQ_Q which have phase differences of 90 degrees based on the sampling timing of the fourth sampling circuit 34, that is, the fourth sampling output signal DQ_QB. For example, the fourth interference cancellation circuit 24 may cancel the first post cursor component according to the sampling timing of the fourth sampling circuit 34 in response to the internal input signal DQ_int, the first weight application signal W1, and the second sampling output signal DQ_IB. The fourth interference cancellation circuit 24 may cancel the second post cursor component according to the sampling timing of the fourth sampling circuit 34 in response to the internal input signal DQ_int, the second weight application signal W2, and the third sampling output signal DQ_Q. The fourth interference cancellation circuit 24 may cancel the third post cursor component according to the sampling timing of the fourth sampling circuit 34 in response to the internal input signal DQ_int, the third weight application signal W3, and the first sampling output signal DQ_I. The fourth interference cancellation circuit 24 may cancel the fourth post cursor component according to the sampling timing of the fourth sampling circuit 34 in response to the internal input signal DQ_int, the fourth weight application signal W4, and the fourth sampling output signal DQ_QB. In this way, the fourth interference cancellation circuit 24 may generate the fourth interference-cancelled signal S_icD which is cancelled with the first to fourth post cursor components.

The first sampling circuit 31 may generate the first sampling output signal DQ_I in response to the first interference-cancelled signal S_icA and a first clock CLK_I (signal). For example, the first sampling circuit 31 may sample the first interference-cancelled signal S_icA in response to the first clock CLK_I, and output a sampled signal as the first sampling output signal DQ_I.

The second sampling circuit 32 may generate the second sampling output signal DQ_IB in response to the second interference-cancelled signal S_icB and a second clock CLK_IB (signal). For example, the second sampling circuit 32 may sample the second interference-cancelled signal S_icB in response to the second clock CLK_IB, and output a sampled signal as the second sampling output signal DQ_IB.

The third sampling circuit 33 may generate the third sampling output signal DQ_Q in response to the third interference-cancelled signal S_icC and a third clock CLK_Q (signal). For example, the third sampling circuit 33 may sample the third interference-cancelled signal S_icC in response to the third clock CLK_Q, and output a sampled signal as the third sampling output signal DQ_Q.

The fourth sampling circuit 34 may generate the fourth sampling output signal DQ_QB in response to the fourth interference-cancelled signal S_icD and a fourth clock CLK_QB (signal). For example, the fourth sampling circuit 34 may sample the fourth interference-cancelled signal S_icD in response to the fourth clock CLK_QB, and output a sampled signal as the fourth sampling output signal DQ_QB.

Figure 3:
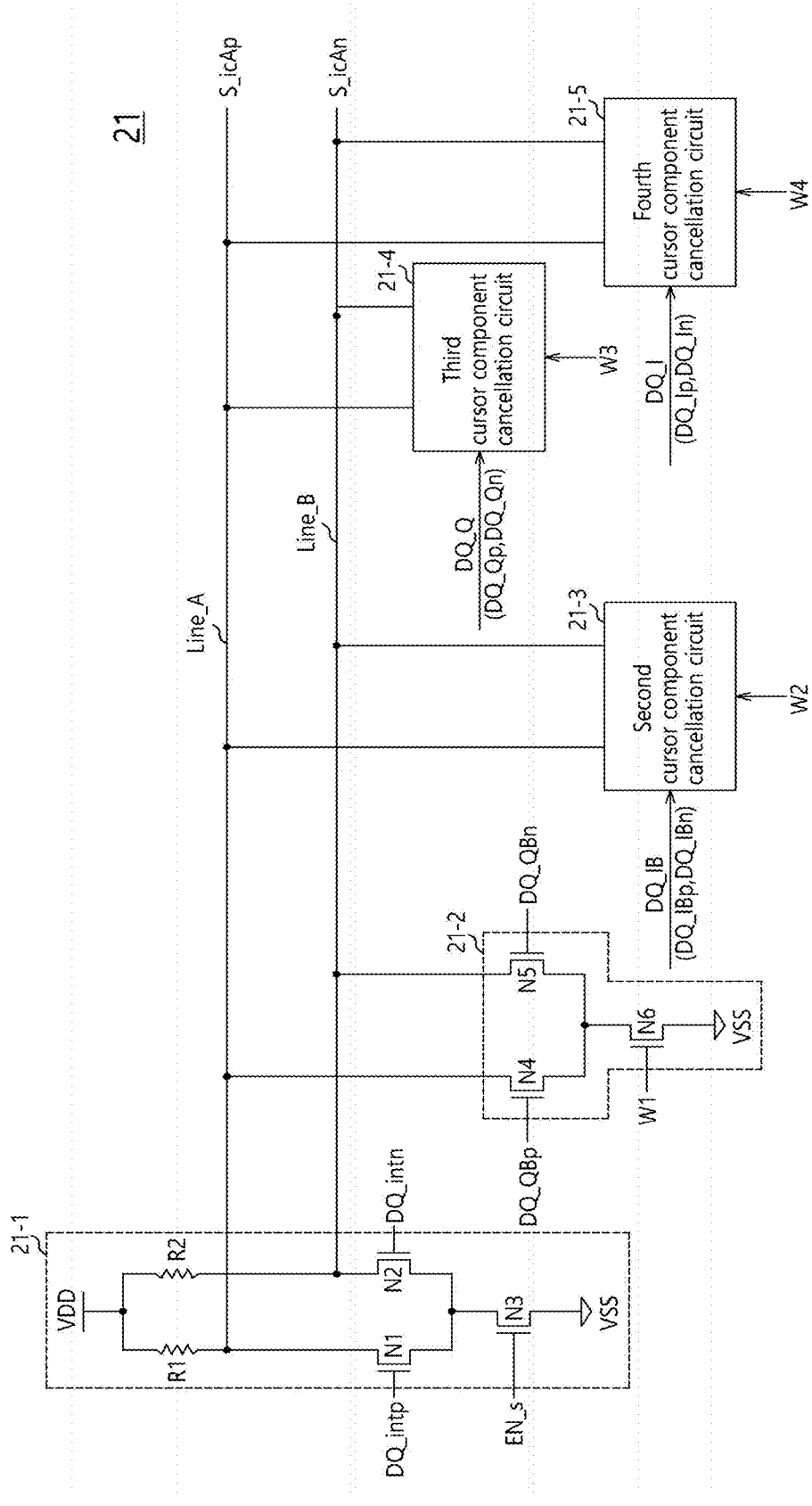
FIG. 3 is a configuration diagram illustrating a representation of an example of the first interference cancellation circuit of FIG. 2.

As illustrated in FIG. 3, the first interference cancellation circuit 21 may include a buffering circuit 21-1 and first to fourth cursor component cancellation circuits 21-2, 21-3, 21-4, and 21-5. The internal input signal DQ_int may be a differential signal which includes a positive internal input signal DQ_intp and a negative internal input signal D_intn. For reference, an embodiment including additional components may be provided. Furthermore, a logic high or logic low configuration indicating a state of a signal or circuit may be changed depending on embodiments. Furthermore, the configuration of a transistor required for implementing the same function may be modified. That is, the configuration of the PMOS transistor and the configuration of the NMOS transistor may be replaced with each other, depending on a specific situation. If necessary, various transistors may be applied to implement the configurations.

The buffering circuit 21-1 may buffer the internal input signal DQ_int, that is, the positive internal input signal DQ_intp and the negative internal input signal D_intn, and transfer resultant signals to the first to fourth cursor component cancellation circuits 21-2, 21-3, 21-4, and 21-5.

The buffering circuit 21-1 may include first and second resistors R1 and R2 and first to third transistors N1, N2, and N3. The first resistor R1 has one end which is applied with an external voltage VDD. The second resistor R2 has one end which is applied with the external voltage VDD. The first transistor N1 has a gate which is inputted with the positive internal input signal D_intp and a drain to which the other end of the first resistor R1 is coupled. The second transistor N2 has a gate which is inputted with the negative internal input signal D_intn and a drain to which the other end of the second resistor R2 is coupled. The third transistor N3 has a gate which is inputted with an enable signal EN_s, a drain to which sources of the first and second transistors N1 and N2 are coupled in common, and a source to which a ground terminal VSS is coupled. A first line Line_A is coupled to a node to which the first resistor R1 and the first transistor N1 are coupled, and a second line Line_B is coupled to a node to which the second resistor R2 and the second transistor N2 are coupled.

The first to fourth cursor component cancellation circuits 21-2, 21-3, 21-4 and 21-5 may generate the first interference-cancelled signal S_icA which is cancelled with the first to fourth post cursor components. For example, the first cursor component cancellation circuit 21-2 may cancel the first post cursor component. The second cursor component cancellation circuit 21-3 may cancel the second post cursor component. The third cursor component cancellation circuit 21-4 may cancel the third post cursor component. The fourth cursor component cancellation circuit 21-5 may cancel the fourth post cursor component.

The first cursor component cancellation circuit 21-2 may include fourth to sixth transistors N4, N5, and N6. The fourth transistor N4 has a gate which is inputted with a fourth positive sampling output signal DQ_QBp and a drain to which the first line Line_A is coupled. The fifth transistor N5 has a gate which is inputted with a fourth negative sampling output signal DQ_QBn and a drain to which the second line Line_B is coupled. The sixth transistor N6 has a gate which is inputted with the first weight application signal W1, a drain to which sources of the fourth and fifth transistors N4 and N5 are coupled, and a source to which the ground terminal VSS is coupled. Each of the internal input signal DQ_int, the first to fourth sampling output signals DQ_I, DQ_IB, DQ_Q and DQ_QB and the first interference-cancelled signal S_icA may be a differential signal. For example, the internal input signal DQ_int may include a positive internal input signal DQ_intp and a negative internal input signal D_intn. The first sampling output signal DQ_I may include a positive first sampling output signal DQ_Ip and a negative first sampling output signal DQ_In. The second sampling output signal DQ_IB may include a positive second sampling output signal DQ_IBp and a negative second sampling output signal DQ_IBn. The third sampling output signal DQ_Q may include a positive third sampling output signal DQ_Qp and a negative third sampling output signal DQ_Qn. The fourth sampling output signal DQ_QB may include a positive fourth sampling output signal DQ_QBp and a negative fourth sampling output signal DQ_QBn. The first interference-cancelled signal S_icA may include a positive first interference-cancelled signal S_icAp and a negative first interference-cancelled signal S_icAn. The first line Line_A may be a line which outputs the positive first interference-cancelled signal S_icAp through the first to fourth cursor component cancellation circuits 21-2, 21-3, 21-4 and 21-5 from the buffering circuit 21-1, and the second line Line_B may be a line which outputs the negative first interference-cancelled signal S_icAn through the first to fourth cursor component cancellation circuits 21-2, 21-3, 21-4 and 21-5 from the buffering circuit 21-1.

The second to fourth cursor component cancellation circuits 21-3, 21-4, and 21-5 may also be configured in the same manner as the first cursor component cancellation circuit 21-2.

The respective first to fourth cursor component cancellation circuits 21-2, 21-3, 21-4, and 21-5 configured as mentioned above may operate as follows.

The first cursor component cancellation circuit 21-2 may cancel the first post cursor components of the signals transferred through the first and second lines Line_A and Line_B in response to the fourth sampling output signal DQ_QB which may include the positive fourth sampling output signal DQ_QBp and the negative fourth sampling output signal DQ_QBn and the first weight application signal W1.

The second cursor component cancellation circuit 21-3 may cancel the second post cursor components of the signals transferred through the first and second lines Line_A and Line_B in response to the second sampling output signal DQ_IB which may include the positive second sampling output signal DQ_IBp and the negative second sampling output signal DQ_IBn and the second weight application signal W2.

The third cursor component cancellation circuit 21-4 may cancel the third post cursor components of the signals transferred through the first and second lines Line_A and Line_B in response to the third sampling output signal DQ_Q which may include the positive third sampling output signal DQ_Qp and the negative third sampling output signal DQ_Qn and the third weight application signal W3.

The fourth cursor component cancellation circuit 21-5 may cancel the fourth post cursor components of the signals transferred through the first and second lines Line_A and Line_B in response to the first sampling output signal DQ_I which may include the positive first sampling output signal DQ_Ip and the negative first sampling output signal DQ_In and the fourth weight application signal W4.

The first to fourth cursor component cancellation circuits 21-2, 21-3, 21-4, and 21-5 configured as mentioned above may determine amounts of sink currents to be flowed to the ground terminal VSS, depending on the voltage levels of the respective weight application signals W1, W2, W3, and W4 inputted thereto. The first to fourth cursor component cancellation circuits 21-2, 21-3, 21-4, and 21-5 may determine the cancellation timings of the first to fourth post cursor components by flowing the sink currents to the ground terminal VSS in response to the first to fourth sampling output signals DQ_I, DQ_IB, DQ_Q, and DQ_QB which are fed back.

The second to fourth interference cancellation circuits 22, 23, and 24 may be configured in the same manner as the first interference cancellation circuit 21 except that only input and output (input/output) signals are different.

The symbol interference cancellation circuit in accordance with an embodiment, configured as mentioned above, may operate as follows.

The internal input signal DQ_int is inputted to the first to fourth interference cancellation circuits 21, 22, 23, and 24.

The first to fourth interference cancellation circuits 21, 22, 23, and 24 may cancel interferences between the symbols of the internal input signal DQ_int in response to the first to fourth sampling output signals DQ_I, DQ_IB, DQ_Q, and DQ_QB and the first to fourth weight application signals W1, W2, W3, and W4, and generate the first to fourth interference-cancelled signals S_icA, S_icB, S_icC and S_icD which are cancelled with the interferences.

For example, the first interference cancellation circuit 21 may cancel the first post cursor component according to the sampling timing of the first sampling circuit 31 in response to the internal input signal DQ_int, the first weight application signal W1 and the fourth sampling output signal DQ_QB. The first interference cancellation circuit 21 may cancel the second post cursor component according to the sampling timing of the first sampling circuit 31 in response to the internal input signal DQ_int, the second weight application signal W2 and the second sampling output signal DQ_IB. The first interference cancellation circuit 21 may cancel the third post cursor component according to the sampling timing of the first sampling circuit 31 in response to the internal input signal DQ_int, the third weight application signal W3 and the third sampling output signal DQ_Q. The first interference cancellation circuit 21 may cancel the fourth post cursor component according to the sampling timing of the first sampling circuit 31 in response to the internal input signal DQ_int, the fourth weight application signal W4 and the first sampling output signal DQ_I. The second interference cancellation circuit 22 may cancel the first post cursor component according to the sampling timing of the second sampling circuit 32 in response to the internal input signal DQ_int, the first weight application signal W1 and the third sampling output signal DQ_Q. The second interference cancellation circuit 22 may cancel the second post cursor component according to the sampling timing of the second sampling circuit 32 in response to the internal input signal DQ_int, the second weight application signal W2 and the first sampling output signal DQ_I. The second interference cancellation circuit 22 may cancel the third post cursor component according to the sampling timing of the second sampling circuit 32 in response to the internal input signal DQ_int, the third weight application signal W3 and the fourth sampling output signal DQ_QB. The second interference cancellation circuit 22 may cancel the fourth post cursor component according to the sampling timing of the second sampling circuit 32 in response to the internal input signal DQ_int, the fourth weight application signal W4 and the second sampling output signal DQ_IB. The third interference cancellation circuit 23 may cancel the first post cursor component according to the sampling timing of the third sampling circuit 33 in response to the internal input signal DQ_int, the first weight application signal W1 and the first sampling output signal DQ_I. The third interference cancellation circuit 23 may cancel the second post cursor component according to the sampling timing of the third sampling circuit 33 in response to the internal input signal DQ_int, the second weight application signal W2 and the fourth sampling output signal DQ_QB. The third interference cancellation circuit 23 may cancel the third post cursor component according to the sampling timing of the third sampling circuit 33 in response to the internal input signal DQ_int, the third weight application signal W3 and the second sampling output signal DQ_IB. The third interference cancellation circuit 23 may cancel the fourth post cursor component according to the sampling timing of the third sampling circuit 33 in response to the internal input signal DQ_int, the fourth weight application signal W4 and the third sampling output signal DQ_Q. The fourth interference cancellation circuit 24 may cancel the first post cursor component according to the sampling timing of the fourth sampling circuit 34 in response to the internal input signal DQ_int, the first weight application signal W1 and the second sampling output signal DQ_IB. The fourth interference cancellation circuit 24 may cancel the second post cursor component according to the sampling timing of the fourth sampling circuit 34 in response to the internal input signal DQ_int, the second weight application signal W2 and the third sampling output signal DQ_Q. The fourth interference cancellation circuit 24 may cancel the third post cursor component according to the sampling timing of the fourth sampling circuit 34 in response to the internal input signal DQ_int, the third weight application signal W3 and the first sampling output signal DQ_I. The fourth interference cancellation circuit 24 may cancel the fourth post cursor component according to the sampling timing of the fourth sampling circuit 34 in response to the internal input signal DQ_int, the fourth weight application signal W4 and the fourth sampling output signal DQ_QB.

The first sampling circuit 31 may sample the first interference-cancelled signal S_icA in response to the first clock CLK_I, and output a sampled signal as the first sampling output signal DQ_I.

The second sampling circuit 32 may sample the second interference-cancelled signal S_icB in response to the second clock CLK_IB, and output a sampled signal as the second sampling output signal DQ_IB.

The third sampling circuit 33 may sample the third interference-cancelled signal S_icC in response to the third clock CLK_Q, and output a sampled signal as the third sampling output signal DQ_Q.

The fourth sampling circuit 34 may sample the fourth interference-cancelled signal S_icD in response to the fourth clock CLK_QB, and output a sampled signal as the fourth sampling output signal DQ_QB.

As in the above operation, the symbol interference cancellation circuit in accordance with an embodiment may cancel interferences between symbols in response to weight application signals having size information of symbol interferences and feedback signals (sampling output signals) having timing information of the symbol interferences. In this regard, the first to fourth interference cancellation circuits 21, 22, 23, and 24 which have the same configurations except different input/output signals may cause problems in that they increase power consumption and increase a circuit area. Further, the logic levels of the signals may be different from or the opposite of those described. For example, a signal described as having a logic "high" level may alternatively have a logic "low" level, and a signal described as having a logic "low" level may alternatively have a logic "high" level.

Figure 4:
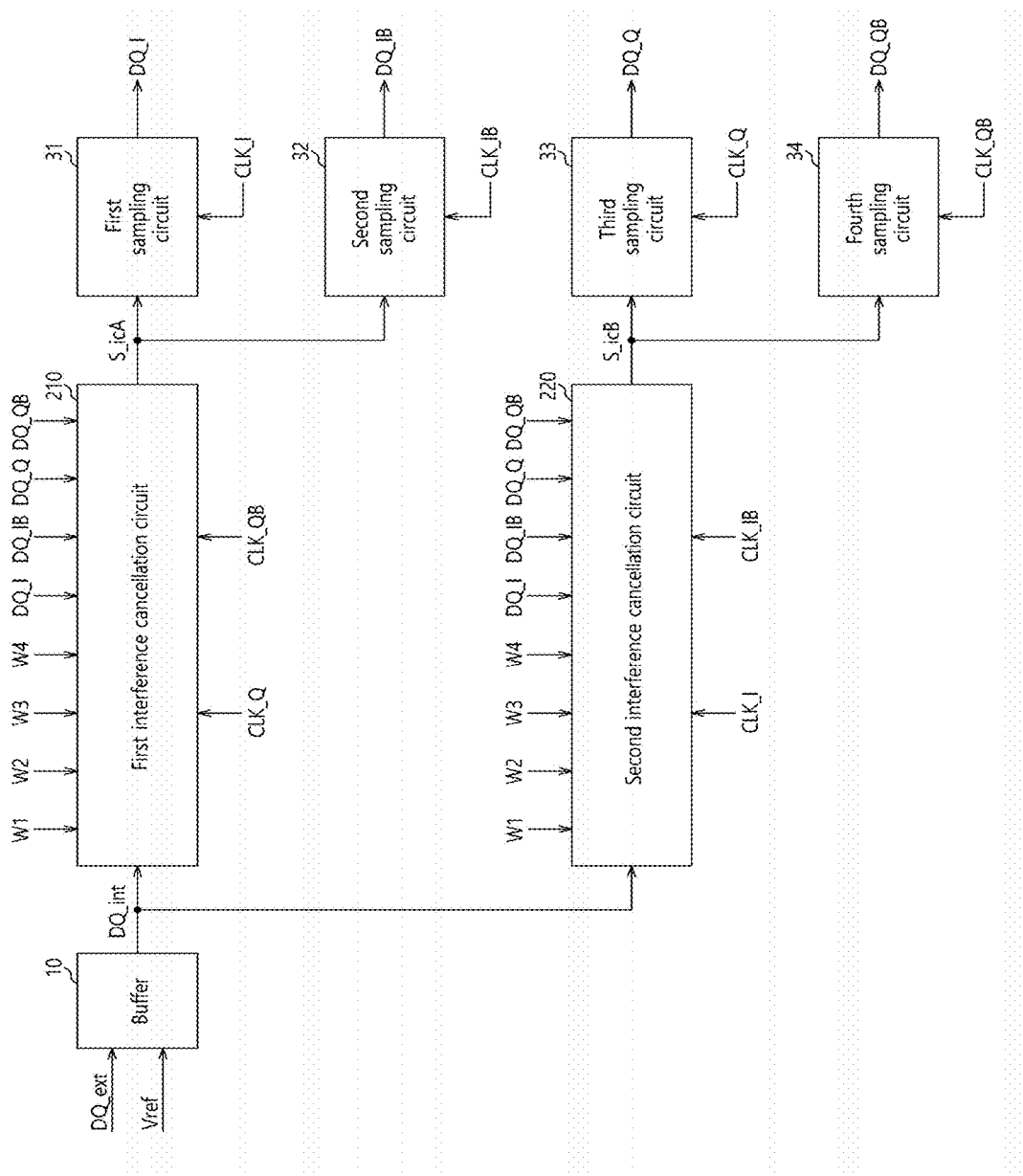
FIG. 4 is a configuration diagram illustrating a representation of an example of a symbol interference cancellation circuit in accordance an embodiment.

As illustrated in FIG. 4, a symbol interference cancellation circuit in accordance with an embodiment may include a buffer 10, a first interference cancellation circuit 210, a second interference cancellation circuit 220, a first sampling circuit 31, a second sampling circuit 32, a third sampling circuit 33, and a fourth sampling circuit 34. For reference, an embodiment including additional components may be provided. Furthermore, a logic high or logic low configuration indicating a state of a signal or circuit may be changed depending on embodiments. Furthermore, the configuration of a transistor required for implementing the same function may be modified. That is, the configuration of the PMOS transistor and the configuration of the NMOS transistor may be replaced with each other, depending on a specific situation. If necessary, various transistors may be applied to implement the configurations.

The buffer 10 may buffer an external input signal DQ_ext, and output an internal input signal DQ_int. For example, the buffer 10 may determine the voltage level of the internal input signal DQ_int by determining the voltage level of the external input signal DQ_ext based on the voltage level of a reference voltage Vref, and output the internal input signal DQ_int of which voltage level is determined.

The first interference cancellation circuit 210 may generate a first interference-cancelled signal S_icA which is cancelled with first to fourth post cursor components in synchronization with the sampling timing of the first sampling circuit 31 or the second sampling circuit 32 in response to first to fourth weight application signals W1, W2, W3, and W4, first to fourth sampling output signals DQ_I, DQ_IB, DQ_Q, and DQ_QB, a third clock CLK_Q (signal), a fourth clock CLK_QB (signal) and the internal input signal DQ_int. For example, the first interference cancellation circuit 21 may cancel the first post cursor component according to the sampling timing of the first sampling circuit 31 in response to the internal input signal DQ_int, the first weight application signal W1 and the fourth sampling output signal DQ_QB when the fourth clock CLK_QB transitions to a specified level, that is, for example, a high level. The first interference cancellation circuit 21 may cancel the second post cursor component according to the sampling timing of the first sampling circuit 31 in response to the internal input signal DQ_int, the second weight application signal W2 and the second sampling output signal DQ_IB when the fourth clock CLK_QB transitions to the specified level, that is, for example, the high level. The first interference cancellation circuit 21 may cancel the third post cursor component according to the sampling timing of the first sampling circuit 31 in response to the internal input signal DQ_int, the third weight application signal W3 and the third sampling output signal DQ_Q when the fourth clock CLK_QB transitions to the specified level, that is, for example, the high level. The first interference cancellation circuit 21 may cancel the fourth post cursor component according to the sampling timing of the first sampling circuit 31 in response to the internal input signal DQ_int, the fourth weight application signal W4 and the first sampling to output signal DQ_I when the fourth clock CLK_QB transitions to the specified level, that is, for example, the high level.

The first interference cancellation circuit 21 may generate the first interference-cancelled signal S_icA which is cancelled with the first to fourth post cursor components according to the sampling timing of the first sampling circuit 31 when the fourth clock CLK_QB transitions to the specified level, that is, for example, the high level. The respective voltage levels of the first to fourth weight application signals W1, W2, W3, and W4 may include information on amounts of cursor components to be cancelled, and the first to fourth weight application signals W1, W2, W3, and W4 may be outputted through a controller or a storage circuit which stores information on amounts of cursor components.

The first interference cancellation circuit 210 may cancel the first post cursor component according to the sampling timing of the second sampling circuit 32 in response to the internal input signal DQ_int, the third weight application signal W3 and the fourth sampling output signal DQ_QB when the third clock CLK_Q transitions to a specified level, that is, for example, a high level. The first interference cancellation circuit 210 may cancel the second post cursor component according to the sampling timing of the second sampling circuit 32 in response to the internal input signal DQ_int, the fourth weight application signal W4 and the second sampling output signal DQ_IB when the third clock CLK_Q transitions to the specified to level, that is, for example, the high level. The first interference cancellation circuit 210 may cancel the third post cursor component according to the sampling timing of the second sampling circuit 32 in response to the internal input signal DQ_int, the first weight application signal W1 and the third sampling output signal DQ_Q when the third clock CLK_Q transitions to the specified level, that is, for example, the high level. The first interference cancellation circuit 210 may cancel the fourth post cursor component according to the sampling timing of the second sampling circuit 32 in response to the internal input signal DQ_int, the second weight application signal W2 and the first sampling output signal DQ_I when the third clock CLK_Q transitions to the specified level, that is, for example, the high level.

The first interference cancellation circuit 210 may generate the first interference-cancelled signal S_icA which is cancelled with the first to fourth post cursor components according to the sampling timing of the second sampling circuit 32 when the third clock CLK_Q transitions to the specified level, that is, for example, the high level.

The second interference cancellation circuit 220 may generate a second interference-cancelled signal S_icB which is cancelled with first to fourth post cursor components in synchronization with the sampling timing of the third sampling circuit 33 or the fourth sampling circuit 34 in response to the first to fourth weight application signals W1, W2, W3, and W4, the first to fourth sampling output signals DQ_I, DQ_IB, DQ_Q, and DQ_QB, a first clock CLK_I (signal), a second clock CLK_IB (signal) and the internal input signal DQ_int. For example, the second interference cancellation circuit 220 may cancel the first post cursor component according to the sampling timing of the third sampling circuit 33 in response to the internal input signal DQ_int, the first weight application signal W1 and the first sampling output signal DQ_I when the first clock CLK_I transitions to a specified level, that is, for example, a high level. The second interference cancellation circuit 220 may cancel the second post cursor component according to the sampling timing of the third sampling circuit 33 in response to the internal input signal DQ_int, the second weight application signal W2 and the fourth sampling output signal DQ_QB when the first clock CLK_I transitions to the specified level, that is, for example, the high level. The second interference cancellation circuit 220 may cancel the third post cursor component according to the sampling timing of the third sampling circuit 33 in response to the internal input signal DQ_int, the third weight application signal W3 and the second sampling output signal DQ_IB when the first clock CLK_I transitions to the specified level, that is, for example, the high level. The second interference cancellation circuit 220 may cancel the fourth post cursor component according to the sampling timing of the third sampling circuit 33 in response to the internal input signal DQ_int, the fourth weight application signal W4 and the third sampling output signal DQ_Q when the first clock CLK_I transitions to the specified level, that is, for example, the high level.

The second interference cancellation circuit 220 may generate the second interference-cancelled signal S_icB which is cancelled with the first to fourth post cursor components according to the sampling timing of the third sampling circuit 33 when the first clock CLK_I transitions to the specified level, that is, for example, the high level.

The second interference cancellation circuit 220 may cancel the first post cursor component according to the sampling timing of the fourth sampling circuit 34 in response to the internal input signal DQ_int, the third weight application signal W3 and the first sampling output signal DQ_I when the second clock CLK_IB transitions to a specified level, that is, for example, a high level. The second interference cancellation circuit 220 may cancel the second post cursor component according to the sampling timing of the fourth sampling circuit 34 in response to the internal input signal DQ_int, the fourth weight application signal W4 and the fourth sampling output signal DQ_QB when the second clock CLK_IB transitions to the specified level, that is, for example, the high level. The second interference cancellation circuit 220 may cancel the third post cursor component according to the sampling timing of the fourth sampling circuit 34 in response to the internal input signal DQ_int, the first weight application signal W1 and the second sampling output signal DQ_IB when the second clock CLK_IB transitions to the specified level, that is, for example, the high level. The second interference cancellation circuit 220 may cancel the fourth post cursor component according to the sampling timing of the fourth sampling circuit 34 in response to the internal input signal DQ_int, the second weight application signal W2 and the third sampling output signal DQ_Q when the second clock CLK_IB transitions to the specified level, that is, for example, the high level.

The second interference cancellation circuit 220 may generate the second interference-cancelled signal S_icB which is cancelled with the first to fourth post cursor components according to the sampling timing of the fourth sampling circuit 34 when the second clock CLK_IB transitions to the specified level, that is, for example, the high level.

The first sampling circuit 31 may generate the first sampling output signal DQ_I in response to the first interference-cancelled signal S_icA which is generated when the fourth clock CLK_QB transitions to the specified level, that is, for example, the high level, and the first clock CLK_I. For example, the first sampling circuit 31 may sample the first interference-cancelled signal S_icA which is generated when the fourth clock CLK_QB transitions to the specified level, that is, for example, the high level, in response to the first clock CLK_I, and output a sampled signal as the first sampling output signal DQ_I.

The second sampling circuit 32 may generate the second sampling output signal DQ_IB in response to the first interference-cancelled signal S_icA which is generated when the third clock CLK_Q transitions to the specified level, that is, for example, the high level, and the second clock CLK_IB. For example, the second sampling circuit 32 may sample the first interference-cancelled signal S_icA which is generated when the third clock CLK_Q transitions to the specified level, that is, for example, the high level, in response to the second clock CLK_IB, and output a sampled signal as the second sampling output signal DQ_IB.

The third sampling circuit 33 may generate the third sampling output signal DQ_Q in response to the second interference-cancelled signal S_icB which is generated when the first clock CLK_I transitions to the specified level, that is, for example, the high level, and the third clock CLK_Q. For example, the third sampling circuit 33 may sample the second interference-cancelled signal S_icB which is generated when the first clock CLK_I transitions to the specified level, that is, for example, the high level, in response to the third clock CLK_Q, and output a sampled signal as the third sampling output signal DQ_Q.

The fourth sampling circuit 34 may generate the fourth sampling output signal DQ_QB in response to the second interference-cancelled signal S_icB which is generated when the second clock CLK_IB transitions to the specified level, that is, for example, the high level, and the fourth clock CLK_QB. For example, the fourth sampling to circuit 34 may sample the second interference-cancelled signal S_icB which is generated when the second clock CLK_IB transitions to the specified level, that is, for example, the high level, in response to the fourth clock CLK_QB, and output a sampled signal as the fourth sampling output signal DQ_QB.

Figure 5:
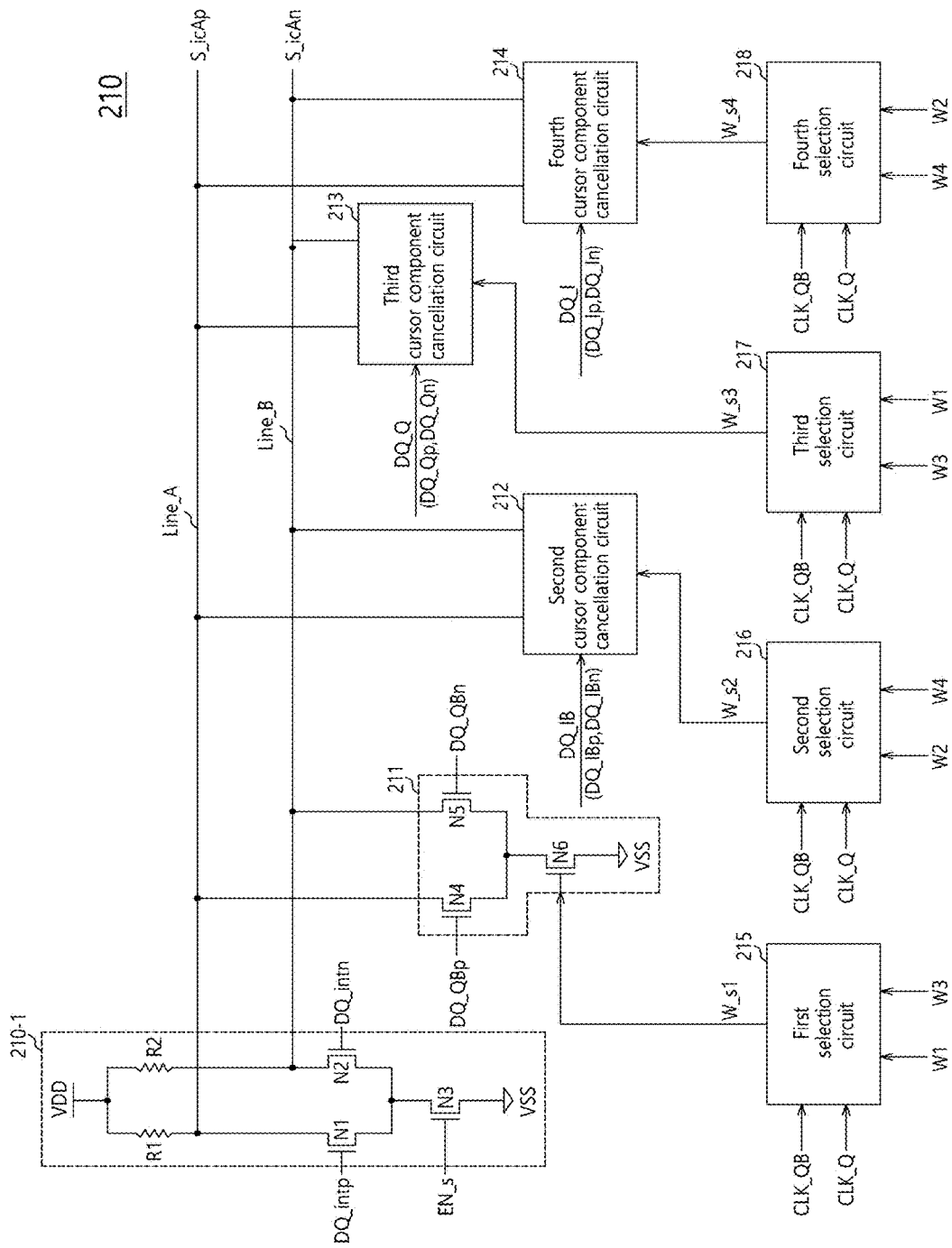
FIG. 5 is a configuration diagram illustrating a representation of an example of the first interference cancellation circuit of FIG. 4.

Referring to FIG. 5, the first interference cancellation circuit 210 may include a buffering circuit 210-1, first to fourth cursor component cancellation circuits 211, 212, 213, and 214 and first to fourth selection circuits 215, 216, 217, and 218. The buffering circuit 210-1 and the first to fourth cursor component cancellation circuits 211, 212, 213, and 214 illustrated in FIG. 5 may be configured in the same manner as the buffering circuit 21-1 and the first to fourth cursor component cancellation circuits 21-2, 21-3, 21-4, and 21-5 illustrated in FIG. 3. Further, the logic levels of the signals may be different from or the opposite of those described. For example, a signal described as having a logic "high" level may alternatively have a logic "low" level, and a signal described as having a logic "low" level may alternatively have a logic "high" level. For reference, an embodiment including additional components may be provided. Furthermore, a logic high or logic low configuration indicating a state of a signal or circuit may be changed depending on embodiments.

Furthermore, the configuration of a transistor required for implementing the same function may be modified. That is, the configuration of the PMOS transistor and the configuration of the NMOS transistor may be replaced with each other, depending on a specific situation. If necessary, various transistors may be applied to implement the configurations.

The first selection circuit 215 may transfer one of the first weight application signal W1 and the third weight application signal W3 as a first weight selection signal W_s1 to the first cursor component cancellation circuit 211 in response to the fourth clock CLK_QB and the third clock CLK_Q. For example, the first selection circuit 215 may output the first weight application signal W1 as the first weight selection signal W_s1 when the fourth clock CLK_QB transitions to the specified level, that is, for example, the high level. The first selection circuit 215 may output the third weight application signal W3 as the first weight selection signal W_s1 when the third clock CLK_Q transitions to the specified level, that is, for example, the high level.

The second selection circuit 216 may transfer one of the second weight application signal W2 and the fourth weight application signal W4 as a second weight selection signal W_s2 to the second cursor component cancellation circuit 212 in response to the fourth clock CLK_QB and the third clock CLK_Q. For example, the second selection circuit 216 may output the second weight application signal W2 as the second weight selection signal W_s2 when the fourth clock CLK_QB transitions to the specified level, that is, for example, the high level. The second selection circuit 216 may output the fourth weight application signal W4 as the second weight selection signal W_s2 when the third clock CLK_Q transitions to the specified level, that is, for example, the high level.

The third selection circuit 217 may transfer one of the third weight application signal W3 and the first weight application signal W1 as a third weight selection signal W_s3 to the third cursor component cancellation circuit 213 in response to the fourth clock CLK_QB and the third clock CLK_Q. For example, the third selection circuit 217 may output the third weight application signal W3 as the third weight selection signal W_s3 when the fourth clock CLK_QB transitions to the specified level, that is, for example, the high level. The third selection circuit 217 may output the first weight application signal W1 as the third weight selection signal W_s3 when the third clock CLK_Q transitions to the specified level, that is, for example, the high level.

The fourth selection circuit 218 may transfer one of the fourth weight application signal W4 and the second weight application signal W2 as a fourth weight selection signal W_s4 to the fourth cursor component cancellation circuit 214 in response to the fourth clock CLK_QB and the third clock CLK_Q. For example, the fourth selection circuit 218 may output the fourth weight application signal W4 as the fourth weight selection signal W_s4 when the fourth clock CLK_QB transitions to the specified level, that is, for example, the high level. The fourth selection circuit 218 may output the second weight application signal W2 as the fourth weight selection signal W_s4 when the third clock CLK_Q transitions to the specified level, that is, for example, the high level.

The first to fourth cursor component cancellation circuits 211, 212, 213, and 214 may generate the first interference-cancelled signal S_icA which is cancelled with the first to fourth post cursor components, when the fourth clock CLK_QB transitions to the specified level, that is, for example, the high level.

The first to fourth cursor component cancellation circuits 211, 212, 213, and 214 may generate the first interference-cancelled signal S_icA which is cancelled with the first to fourth post cursor components, when the third clock CLK_Q transitions to the specified level, that is, for example, the high level.

The respective first to fourth cursor component cancellation circuits 211, 212, 213, and 214 may operate as follows.

The first cursor component cancellation circuit 211 may generate the first interference-cancelled signal S_icA which is cancelled with the first post cursor component, in response to the first weight application signal W1 provided from the first selection circuit 215 when the fourth clock CLK_QB transitions to the specified level and the fourth sampling output signal DQ_QB.

The second cursor component cancellation circuit 212 may generate the first interference-cancelled signal S_icA which is cancelled with the second post cursor component, in response to the second weight application signal W2 provided from the second selection circuit 216 when the fourth clock CLK_QB transitions to the specified level and the second sampling output signal DQ_IB.

The third cursor component cancellation circuit 213 may generate the first interference-cancelled signal S_icA which is cancelled with the third post cursor component, in response to the third weight application signal W3 provided from the third selection circuit 217 when the fourth clock CLK_QB transitions to the specified level and the third sampling output signal DQ_Q.

The fourth cursor component cancellation circuit 214 may generate the first interference-cancelled signal S_icA which is cancelled with the fourth post cursor component, in response to the fourth weight application signal W4 provided from the fourth selection circuit 218 when the fourth clock CLK_QB transitions to the specified level and the first sampling output signal DQ_I.

The first cursor component cancellation circuit 211 may generate the first interference-cancelled signal S_icA which is cancelled with the first post cursor component, in response to the third weight application signal W3 provided from the first selection circuit 215 when the third clock CLK_Q transitions to the specified level and the fourth sampling output signal DQ_QB.

The second cursor component cancellation circuit 212 may generate the first interference-cancelled signal S_icA which is cancelled with the second post cursor component, in response to the fourth weight application signal W4 provided from the second selection circuit 216 when the third clock CLK_Q transitions to the specified level and the second sampling output signal DQ_IB.

The third cursor component cancellation circuit 213 may generate the first interference-cancelled signal S_icA which is cancelled with the third post cursor component, in response to the first weight application signal W1 provided from the third selection circuit 217 when the third clock CLK_Q transitions to the specified level and the third sampling output signal DQ_Q.

The fourth cursor component cancellation circuit 214 may generate the first interference-cancelled signal S_icA which is cancelled with the fourth post cursor component, in response to the second weight application signal W2 provided from the fourth selection circuit 218 when the third clock CLK_Q transitions to the specified level and the first sampling output signal DQ_I.

Therefore, the first interference cancellation circuit 210 may generate the first interference-cancelled signal S_icA by different combinations (combinations of sampling output signals and weight application signals) when the fourth clock CLK_QB transitions to the specified level and the third clock CLK_Q transitions to the specified level. For example, the first interference cancellation circuit 210 may generate the first interference-cancelled signal S_icA by the combination of the sampling output signals and the weight application signals of the first interference cancellation circuit 21 illustrated in FIG. 2 in the case where the fourth clock CLK_QB transitions to the specified level. The first interference cancellation circuit 210 may generate the first interference-cancelled signal S_icA by the combination of the sampling output signals and the weight application signals of the second interference cancellation circuit 22 illustrated in FIG. 2 in the case where the third clock CLK_Q transitions to the specified level.

Figure 6:
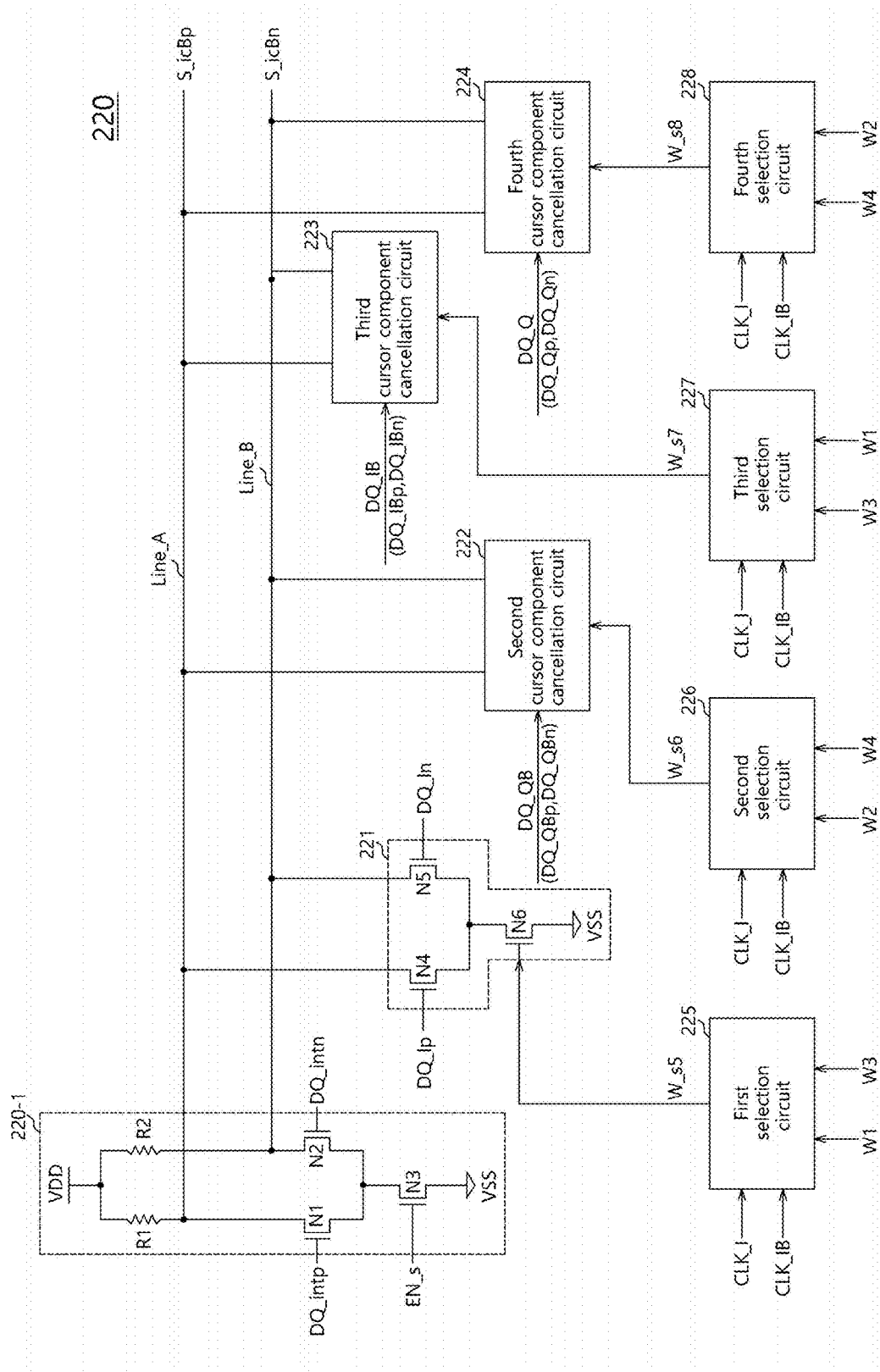
FIG. 6 is a configuration diagram illustrating a representation of an example of the second interference cancellation circuit of FIG. 4.

Referring to FIG. 6, the second interference cancellation circuit 220 may include a buffering circuit 220-1, first to fourth cursor component cancellation circuits 221, 222, 223, and 224 and first to fourth selection circuits 225, 226, 227, and 228. The buffering circuit 220-1 and the first to fourth cursor component cancellation circuits 221, 222, 223, and 224 illustrated in FIG. 6 may be configured in the same manner as the buffering circuit 21-1 and the first to fourth cursor component cancellation circuits 21-2, 21-3, 21-4 and 21-5 illustrated in FIG. 3. Further, the logic levels of the signals may be different from or the opposite of those described. For example, a signal described as having a logic "high" level may alternatively have a logic "low" level, and a signal described as having a logic "low" level may alternatively have a logic "high" level. For reference, an embodiment including additional components may be provided. Furthermore, a logic high or logic low configuration indicating a state of a signal or circuit may be changed depending on embodiments. Furthermore, the configuration of a transistor required for implementing the same function may be modified. That is, the configuration of the PMOS transistor and the configuration of the NMOS transistor may be replaced with each other, depending on a specific situation. If necessary, various transistors may be applied to implement the configurations.

The first selection circuit 225 may transfer one of the first weight application signal W1 and the third weight application signal W3 as a fifth weight selection signal W_s5 to the first cursor component cancellation circuit 221 in response to the first clock CLK_I and the second clock CLK_IB. For example, the first selection circuit 225 may output the first weight application signal W1 as the fifth weight selection signal W_s5 when the first clock CLK_I transitions to the specified level, that is, for example, the high level. The first selection circuit 225 may output the third weight application signal W3 as the fifth weight selection signal W_s5 when the second clock CLK_IB transitions to the specified level, that is, for example, the high level.

The second selection circuit 226 may transfer one of the second weight application signal W2 and the fourth weight application signal W4 as a sixth weight selection signal W_s6 to the second cursor component cancellation circuit 222 in response to the first clock CLK_I and the second clock CLK_IB. For example, the second selection circuit 226 may output the second weight application signal W2 as the sixth weight selection signal W_s6 when the first clock CLK_I transitions to the specified level, that is, for example, the high level. The second selection circuit 226 may output the fourth weight application signal W4 as the sixth weight selection signal W_s6 when the second clock CLK_IB transitions to the specified level, that is, for example, the high level.

The third selection circuit 227 may transfer one of the third weight application signal W3 and the first weight application signal W1 as a seventh weight selection signal W_s7 to the third cursor component cancellation circuit 223 in response to the first clock CLK_I and the second clock CLK_IB. For example, the third selection circuit 227 may output the third weight application signal W3 as the seventh weight selection signal W_s7 when the first clock CLK_I transitions to the specified level, that is, for example, the high level. The third selection circuit 227 may output the first weight application signal W1 as the seventh weight selection signal W_s7 when the second clock CLK_IB transitions to the specified level, that is, for example, the high level.

The fourth selection circuit 228 may transfer one of the fourth weight application signal W4 and the second weight application signal W2 as an eighth weight selection signal W_s8 to the fourth cursor component cancellation circuit 224 in response to the first clock CLK_I and the second clock CLK_IB. For example, the fourth selection circuit 228 may output the fourth weight application signal W4 as the eighth weight selection signal W_s8 when the first clock CLK_I transitions to the specified level, that is, for example, the high level. The fourth selection circuit 228 may output the second weight application signal W2 as the eighth weight selection signal W_s8 when the second clock CLK_IB transitions to the specified level, that is, for example, the high level.

The first to fourth cursor component cancellation circuits 221, 222, 223, and 224 may generate the second interference-cancelled signal S_icB which is cancelled with the first to fourth post cursor components, when the first clock CLK_I transitions to the specified level, that is, for example the high level.

The first to fourth cursor component cancellation circuits 221, 222, 223, and 224 may generate the second interference-cancelled signal S_icB which is cancelled with the first to fourth post cursor components, when the second clock CLK_IB transitions to the specified level, that is, for example, the high level.

The first cursor component cancellation circuit 221 may be configured by a plurality of transistors as illustrated in the first cursor component cancellation circuit 21-2 of FIG. 3, and the second to fourth cursor component cancellation circuits 222, 223, and 224 may be configured in the same manner as the first cursor component cancellation circuit 221.

The respective first to fourth cursor component cancellation circuits 221, 222, 223, and 224 configured as mentioned above may operate as follows.

The first cursor component cancellation circuit 221 may generate the second interference-cancelled signal S_icB which is cancelled with the first post cursor component, in response to the first weight application signal W1 provided from the first selection circuit 225 when the first clock CLK_I transitions to the specified level and the first sampling output signal DQ_I.

The second cursor component cancellation circuit 222 may generate the second interference-cancelled signal S_icB which is cancelled with the second post cursor component, in response to the second weight application signal W2 provided from the second selection circuit 226 when the first clock CLK_I transitions to the 220 specified level and the fourth sampling output signal DQ_QB.

The third cursor component cancellation circuit 223 may generate the second interference-cancelled signal S_icB which is cancelled with the third post cursor component, in response to the third weight application signal W3 provided from the third selection circuit 227 when the first clock CLK_I transitions to the specified level and the second sampling output signal DQ_IB.

The fourth cursor component cancellation circuit 224 may generate the second interference-cancelled signal S_icB which is cancelled with the fourth post cursor component, in response to the fourth weight application signal W4 provided from the fourth selection circuit 228 when the first clock CLK_I transitions to the specified level and the third sampling output signal DQ_Q.

The first cursor component cancellation circuit 221 may generate the second interference-cancelled signal S_icB which is cancelled with the first post cursor component, in response to the third weight application signal W3 provided from the first selection circuit 225 when the second clock CLK_IB transitions to the specified level and the first sampling output signal DQ_I.

The second cursor component cancellation circuit 222 may generate the second interference-cancelled signal S_icB which is cancelled with the second post cursor component, in response to the fourth weight application signal W4 provided from the second selection circuit 226 when the second clock CLK_IB transitions to the specified level and the fourth sampling output signal DQ_QB.

The third cursor component cancellation circuit 223 may generate the second interference-cancelled signal S_icB which is cancelled with the third post cursor component, in response to the first weight application signal W1 provided from the third selection circuit 227 when the second clock CLK_IB transitions to the specified level and the second sampling output signal DQ_IB.

The fourth cursor component cancellation circuit 224 may generate the second interference-cancelled signal S_icB which is cancelled with the fourth post cursor component, in response to the second weight application signal W2 provided from the fourth selection circuit 228 when the second clock CLK_IB transitions to the specified level and the third sampling output signal DQ_Q.

Therefore, the second interference cancellation circuit 220 may generate the second interference-cancelled signal S_icB by different combinations (combinations of sampling output signals and weight application signals) when the first clock CLK_I transitions to the specified level and the second clock CLK_IB transitions to the specified level. For example, the second interference cancellation circuit 220 may generate the second interference-cancelled signal S_icB by the combination of the sampling output signals and the weight application signals of the third interference cancellation circuit 23 illustrated in FIG. 2 in the case where the first clock CLK_I transitions to the specified level. The second interference cancellation circuit 220 may generate the second interference-cancelled signal S_icB by the combination of the sampling output signals and the weight application signals of the fourth interference cancellation circuit 24 illustrated in FIG. 2 in the case where the second clock CLK_IB transitions to the specified level.

The symbol interference cancellation circuit in accordance with an embodiment, configured as mentioned above, may operate as follows.

The internal input signal DQ_int is inputted to the first and second interference cancellation circuits 210 and 220.

The first and second interference cancellation circuits 210 and 220 may cancel interferences between the symbols of the internal input signal DQ_int in response to the first to fourth sampling output signals DQ_I, DQ_IB, DQ_Q, and DQ_QB, the first to fourth weight application signals W1, W2, W3, and W4 and the first to fourth clocks CLK_I, CLK_IB, CLK_Q, and CLK_QB, and generate the first and second interference-cancelled signals S_icA and S_icB which are cancelled with the interferences.

For example, the first interference cancellation circuit 210 may cancel the first post cursor component according to the sampling timing of the first sampling circuit 31 in response to the internal input signal DQ_int, the first weight application signal W1 and the fourth sampling output signal DQ_QB when the fourth clock CLK_QB is the specified level. The first interference cancellation circuit 210 may cancel the second post cursor component according to the sampling timing of the first sampling circuit 31 in response to the internal input signal DQ_int, the second weight application signal W2 and the second sampling output signal DQ_IB when the fourth clock CLK_QB is the specified level. The first interference cancellation circuit 210 may cancel the third post cursor component according to the sampling timing of the first sampling circuit 31 in response to the internal input signal DQ_int, the third weight application signal W3 and the third sampling output signal DQ_Q when the fourth clock CLK_QB is the specified level. The first interference cancellation circuit 210 may cancel the fourth post cursor component according to the sampling timing of the first sampling circuit 31 in response to the internal input signal DQ_int, the fourth weight application signal W4 and the first sampling output signal DQ_I when the fourth clock CLK_QB is the specified level.

The first interference cancellation circuit 210 may cancel the first post cursor component according to the sampling timing of the second sampling circuit 32 in response to the internal input signal DQ_int, the third weight application signal W3 and the fourth sampling output signal DQ_QB when the third clock CLK_Q is the specified level. The first interference cancellation circuit 210 may cancel the second post cursor component according to the sampling timing of the second sampling circuit 32 in response to the internal input signal DQ_int, the fourth weight application signal W4 and the second sampling output signal DQ_IB when the third clock CLK_Q is the specified level. The first interference cancellation circuit 210 may cancel the third post cursor component according to the sampling timing of the second sampling circuit 32 in response to the internal input signal DQ_int, the first weight application signal W1 and the third sampling output signal DQ_Q when the third clock CLK_Q is the specified level. The first interference cancellation circuit 210 may cancel the fourth post cursor component according to the sampling timing of the second sampling circuit 32 in response to the internal input signal DQ_int, the second weight application signal W2 and the first sampling output signal DQ_I when the third clock CLK_Q is the specified level.

The second interference cancellation circuit 220 may cancel the first post cursor component according to the sampling timing of the third sampling circuit 33 in response to the internal input signal DQ_int, the first weight application signal W1 and the first sampling output signal DQ_I when the first clock CLK_I is the specified level. The second interference cancellation circuit 220 may cancel the second post cursor component according to the sampling timing of the third sampling circuit 33 in response to the internal input signal DQ_int, the second weight application signal W2 and the fourth sampling output signal DQ_QB when the first clock CLK_I is the specified level. The second interference cancellation circuit 220 may cancel the third post cursor component according to the sampling timing of the third sampling circuit 33 in response to the internal input signal DQ_int, the third weight application signal W3 and the second sampling output signal DQ_IB when the first clock CLK_I is the specified level. The second interference cancellation circuit 220 may cancel the fourth post cursor component according to the sampling timing of the third sampling circuit 33 in response to the internal input signal DQ_int, the fourth weight application signal W4 and the third sampling output signal DQ_Q when the first clock CLK_I is the specified level.

The second interference cancellation circuit 220 may cancel the first post cursor component according to the sampling timing of the fourth sampling circuit 34 in response to the internal input signal DQ_int, the third weight application signal W3 and the first sampling output signal DQ_I when the second clock CLK_IB is the specified to level. The second interference cancellation circuit 220 may cancel the second post cursor component according to the sampling timing of the fourth sampling circuit 34 in response to the internal input signal DQ_int, the fourth weight application signal W4 and the fourth sampling output signal DQ_QB when the second clock CLK_IB is the specified level. The second interference cancellation circuit 220 may cancel the third post cursor component according to the sampling timing of the fourth sampling circuit 34 in response to the internal input signal DQ_int, the first weight application signal W1 and the second sampling output signal DQ_IB when the second clock CLK_IB is the specified level. The second interference cancellation circuit 220 may cancel the fourth post cursor component according to the sampling timing of the fourth sampling circuit 34 in response to the internal input signal DQ_int, the second weight application signal W2 and the third sampling output signal DQ_Q when the second clock CLK_IB is the specified level.

The first sampling circuit 31 may sample the first interference-cancelled signal S_icA which is outputted when the fourth clock CLK_QB is the specified level, in response to the first clock CLK_I, and output a sampled signal as the first sampling output signal DQ_I.

The second sampling circuit 32 may sample the first interference-cancelled signal S_icA which is outputted when the third clock CLK_Q is the specified level, in response to the second clock CLK_IB, and output a sampled signal as the second sampling output signal DQ_IB.

The third sampling circuit 33 may sample the second interference-cancelled signal S_icB which is outputted when the first clock CLK_I is the specified level, in response to the third clock CLK_Q, and output a sampled signal as the third sampling output signal DQ_Q.

The fourth sampling circuit 34 may sample the second interference-cancelled signal S_icB which is outputted when the second clock CLK_IB is the specified level, in response to the fourth clock CLK_QB, and output a sampled signal as the fourth sampling output signal DQ_QB.

The operation of the symbol interference cancellation circuit in accordance with an embodiment will be described below with reference to FIG. 7. Further, the logic levels of the signals may be different from or the opposite of those described. For example, a signal described as having a logic "high" level may alternatively have a logic "low" level, and a signal described as having a logic "low" level may alternatively have a logic "high" level.

Figure 7:
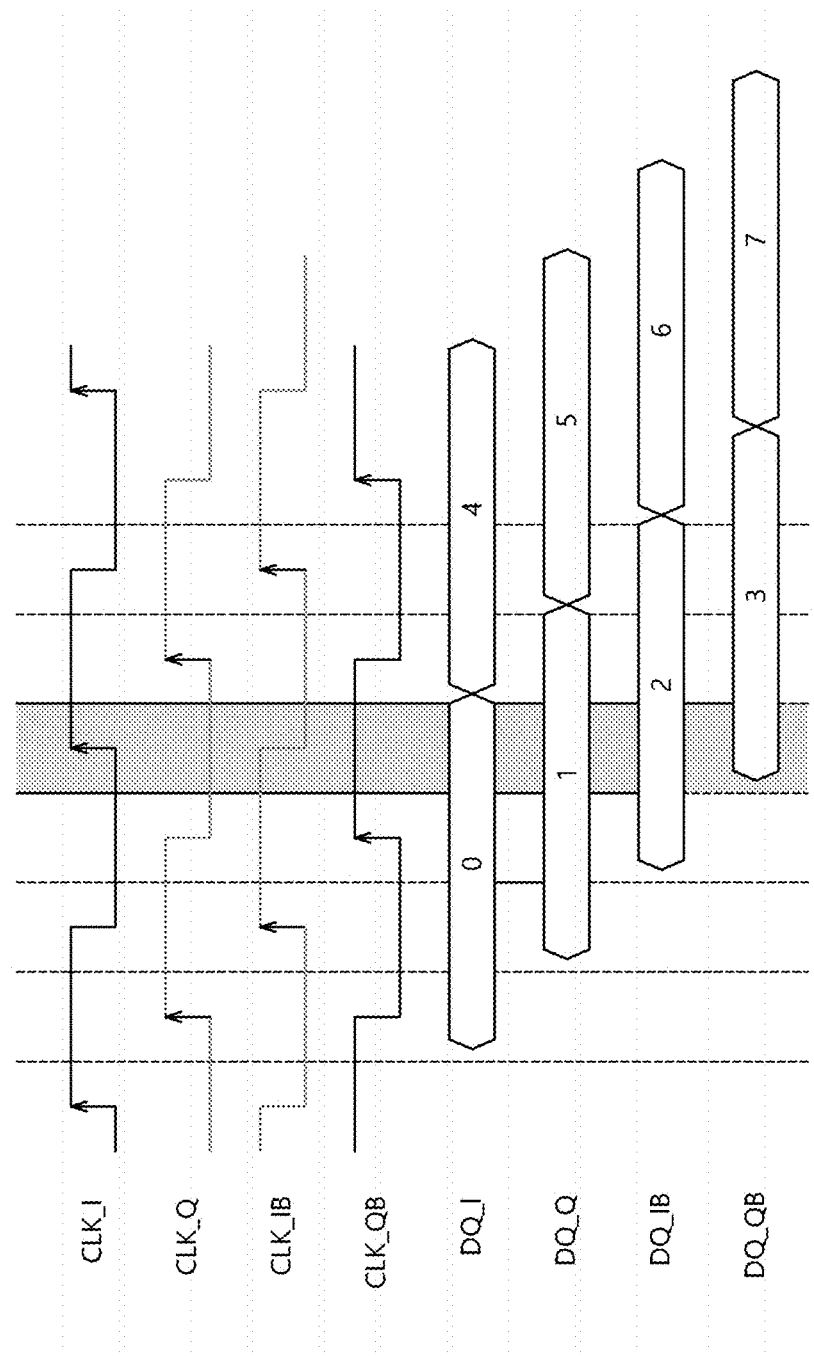
FIG. 7 is a representation of an example of a timing diagram to assist in the explanation of the operation of the symbol interference cancellation circuit in accordance with an embodiment.

Referring to FIG. 7, there are illustrated the phases of the first to fourth clocks CLK_I, CLK_IB, CLK_Q, and CLK_QB and the sampling timings of the first to fourth sampling output signals DQ_I, DQ_IB, DQ_Q, and DQ_QB.

The first clock CLK_I and the second clock CLK_IB have opposite phases, and the third clock CLK_Q and the fourth clock CLK_QB have opposite phases. The phase difference of the first clock CLK_1 and the third clock CLK_Q is 90 degrees. Therefore, when compared based on the first clock CLK_I, the phase difference of the first clock CLK_I and the third clock CLK_Q is 90 degrees, the phase difference of the first clock CLK_I and the second clock CLK_IB is 180 degrees, and the phase difference of the first clock CLK_I and the fourth clock CLK_QB is 270 degrees.

The first sampling output signal DQ_I is a signal which is sampled by the first clock CLK_I, the second sampling output signal DQ_IB is a signal which is sampled by the second clock CLK_IB, the third sampling output signal DQ_Q is a signal which is sampled by the third clock CLK_Q, and the fourth sampling output signal DQ_QB is a signal which is sampled by the fourth clock CLK_QB.

The first sampling circuit 31 is configured to operate by receiving the first interference-cancelled signal S_icA which is generated by the first interference cancellation circuit 210 when the fourth clock CLK_QB which is 90 degrees ahead of the first clock CLK_I in phase transitions to the specified level. At this time, the first interference cancellation circuit 210 has the same combination relationship of sampling output signals and weight application signals as the first interference cancellation circuit 21 illustrated in FIG. 2.

The second sampling circuit 32 is configured to operate by receiving the first interference-cancelled signal S_icA which is generated by the first interference cancellation circuit 210 when the third clock CLK_Q which is 90 degrees ahead of the second clock CLK_IB in phase transitions to the specified level. At this time, the first interference cancellation circuit 210 has the same combination relationship of sampling output signals and weight application signals as the second interference cancellation circuit 22 illustrated in FIG. 2.

The third sampling circuit 33 is configured to operate by receiving the second interference-cancelled signal S_icB which is generated by the second interference cancellation circuit 220 when the first clock CLK_I which is 90 degrees ahead of the third clock CLK_Q in phase transitions to the specified level. At this time, the second interference cancellation circuit 220 has the same combination relationship of sampling output signals and weight application signals as the third interference cancellation circuit 23 illustrated in FIG. 2.

The fourth sampling circuit 34 is configured to operate by receiving the second interference-cancelled signal S_icB which is generated by the second interference cancellation circuit 220 when the second clock CLK_IB which is 90 degrees ahead of the fourth clock CLK_QB in phase transitions to the specified level. At this time, the second interference cancellation circuit 220 has the same combination relationship of sampling output signals and weight application signals as the fourth interference cancellation circuit 24 illustrated in FIG. 2.

Therefore, while the symbol interference cancellation circuit of FIG. 4 in accordance with an embodiment performs substantially the same operation as the symbol interference cancellation circuit of FIG. 2, since the number of interference cancellation circuits is decreased, it may be possible to reduce an area and power consumption by a decreased number of interference cancellation circuits.

Figure 8:
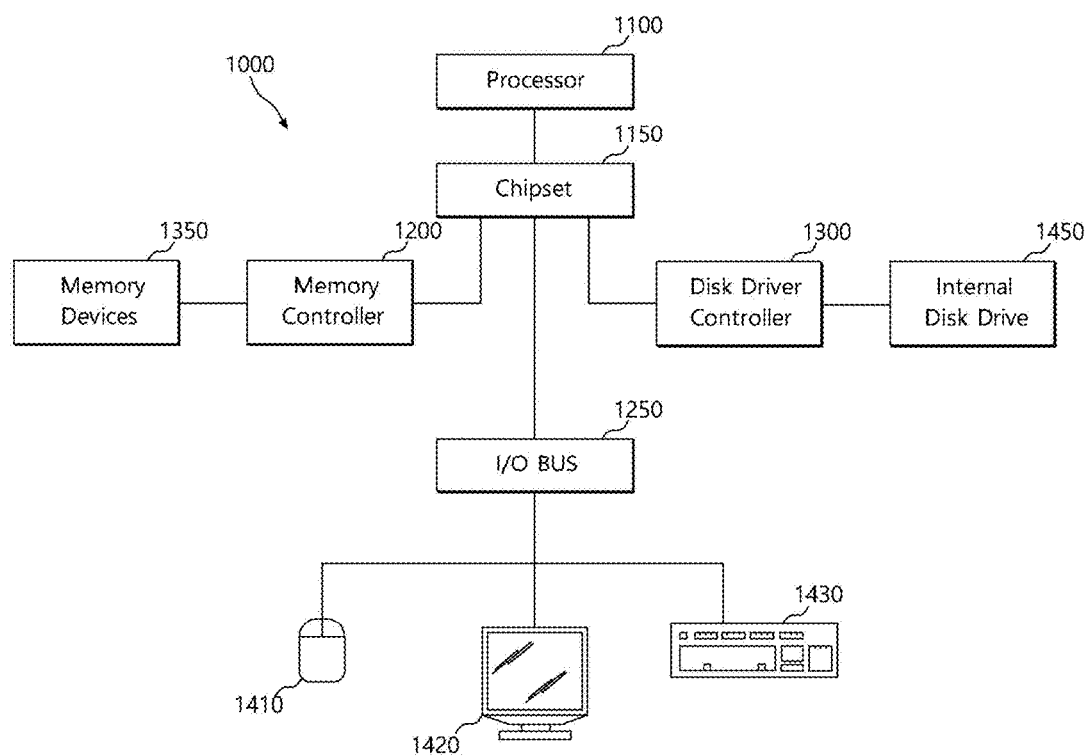
FIG. 8 illustrates a block diagram of an example of a representation of a system employing a semiconductor device and or symbol interference cancellation circuit with the various embodiments discussed above with relation to FIGS. 1-7.

The semiconductor device and or symbol interference cancellation circuit as discussed above (see FIGS. 1-7) are particular useful in the design of other memory devices, processors, and computer systems. For example, referring to FIG. 8, a block diagram of a system employing a semiconductor device and or symbol interference cancellation circuit in accordance with the various embodiments are illustrated and generally designated by a reference numeral 1000. The system 1000 may include one or more processors (i.e., Processor) or, for example but not limited to, central processing units ("CPUs") 1100. The processor (i.e., CPU) 1100 may be used individually or in combination with other processors (i.e., CPUs). While the processor (i.e., CPU) 1100 will be referred to primarily in the singular, it will be understood by those skilled in the art that a system 1000 with any number of physical or logical processors (i.e., CPUs) may be implemented.

A chipset 1150 may be operably coupled to the processor (i.e., CPU) 1100. The chipset 1150 is a communication pathway for signals between the processor (i.e., CPU) 1100 and other components of the system 1000. Other components of the system 1000 may include a memory controller 1200, an input/output ("I/O") bus 1250, and a disk driver controller 1300. Depending on the configuration of the system 1000, any one of a number of different signals may be transmitted through the chipset 1150, and those skilled in the art will appreciate that the routing of the signals throughout the system 1000 can be readily adjusted without changing the underlying nature of the system 1000.

As stated above, the memory controller 1200 may be operably coupled to the chipset 1150. The memory controller 1200 may include at least one semiconductor device and or symbol interference cancellation circuit as discussed above with reference to FIGS. 1-7. Thus, the memory controller 1200 can receive a request provided from the processor (i.e., CPU) 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may include the at least one semiconductor device and or symbol interference cancellation circuit as discussed above with relation to FIGS. 1-7, the memory devices 1350 may include a plurality of word lines and a plurality of bit lines for defining a plurality of memory cells. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420, and 1430. The I/O devices 1410, 1420, and 1430 may include, for example but are not limited to, a mouse 1410, a video display 1420, or a keyboard 1430. The I/O bus 1250 may employ any one of a number of communications protocols to communicate with the I/O devices 1410, 1420, and 1430. In an embodiment, the I/O bus 1250 may be integrated into the chipset 1150.

The disk driver controller 1300 may be operably coupled to the chipset 1150. The disk driver controller 1300 may serve as the communication pathway between the chipset 1150 and one internal disk driver 1450 or more than one internal disk driver 1450. The internal disk driver 1450 may facilitate disconnection of the external data storage devices by storing both instructions and data. The disk driver controller 1300 and the internal disk driver 1450 may communicate with each other or with the chipset 1150 using virtually any type of communication protocol, including, for example but not limited to, all of those mentioned above with regard to the I/O bus 1250.

It is important to note that the system 1000 described above in relation to FIG. 8 is merely one example of a semiconductor device and or symbol interference cancellation circuit as discussed above with relation to FIGS. 1-7. In alternate embodiments, such as, for example but not limited to, cellular phones or digital cameras, the components may differ from the embodiments illustrated in FIG. 8.

While various embodiments have been described above, it is will be understood to those skilled in the art that the embodiments described are examples only. Accordingly, the symbol interference cancellation circuit described herein should not be limited based on the described embodiments.

What is claimed is:

1. A symbol interference cancellation circuit comprising:
    an interference cancellation circuit configured for generating an interference-cancelled signal which is cancelled with post cursor components of an input signal, based on a first weight application signal, a second weight application signal, a first sampling output signal, a second sampling output signal, a first clock signal and a second clock signal;
    a first sampling circuit configured for generating the first sampling output signal based on the first clock signal and the interference-cancelled signal; and
    a second sampling circuit configured for generating the second sampling output signal based on the second clock signal and the interference-cancelled signal,
    wherein the interference cancellation circuit selects one weight application signal of the first weight application signal and the second weight application signal based on the first clock signal, and generates the interference-cancelled signal which is cancelled with the post cursor components of the input signal, based on the selected weight application signal, the first sampling output signal and the second sampling output signal, and
    wherein the interference cancellation circuit selects the other weight application signal of the first weight application signal and the second weight application signal based on the second clock signal, and generates the interference-cancelled signal which is cancelled with the post cursor components of the input signal, based on the selected weight application signal, the first sampling output signal and the second sampling output signal.

2. The symbol interference cancellation circuit according to claim 1, wherein the first clock signal and the second clock signal are different in phase.

3. The symbol interference cancellation circuit according to claim 1,
    wherein the post cursor components of the input signal comprise a first post cursor component and a second post cursor component, and
    wherein, based on the first clock signal being at a specified level, the interference cancellation circuit cancels the first post cursor component of the input signal based on the first weight application signal and the first sampling output signal, cancels the second post cursor component of the input signal based on the second weight application signal and the second sampling output signal, and generates the interference-cancelled signal.

4. The symbol interference cancellation circuit according to claim 3, wherein, based on the second clock signal being at a specified level, the interference cancellation circuit cancels the first post cursor component of the input signal based on the second weight application signal and the first sampling output signal, cancels the second post cursor component of the input signal based on the first weight application signal and the second sampling output signal, and generates the interference-cancelled signal.

5. The symbol interference cancellation circuit according to claim 4, wherein the interference cancellation circuit comprises:
    a first selection circuit configured for outputting one of the first and second weight application signals as a first weight selection signal based on the first and second clock signals;
    a second selection circuit configured for outputting the other of the first and second weight application signals as a second weight selection signal based on the first and second clock signals;
    a first cursor component cancellation circuit configured for cancelling one of the first and second post cursor components based on the first weight selection signal and the first sampling output signal; and
    a second cursor component cancellation circuit configured for cancelling the other of the first and second post cursor components based on the second weight selection signal and the second sampling output signal.

6. The symbol interference cancellation circuit according to claim 5, wherein the first selection circuit outputs the first weight application signal as the first weight selection signal based on the first clock signal being at the specified level, and outputs the second weight application signal as the first weight selection signal based on the second clock signal being at the specified level.

7. The symbol interference cancellation circuit according to claim 5, wherein the second selection circuit outputs the second weight application signal as the second weight selection signal based on the first clock signal being at the specified level, and outputs the first weight application signal as the second weight selection signal based on the second clock signal being at the specified level.

8. The symbol interference cancellation circuit according to claim 7, wherein the first sampling circuit samples the interference-cancelled signal which is outputted based on the second clock signal being at the specified level, based on the first clock signal, and outputs a sampled signal as the first sampling output signal.

9. The symbol interference cancellation circuit according to claim 8, wherein the second sampling circuit samples the interference-cancelled signal which is outputted based on the first clock signal being at the specified level, based on the second clock signal, and outputs a sampled signal as the second sampling output signal.

10. A symbol interference cancellation circuit comprising:
a first interference cancellation circuit configured for generating a first interference-cancelled signal which is cancelled with a first post cursor component, a second post cursor component, a third post cursor component and a fourth post cursor component, based on a first weight application signal, a second weight application signal, a third weight application signal, a fourth weight application signal, a first sampling output signal, a second sampling output signal, a third sampling output signal, a fourth sampling output signal, a third clock signal, a fourth clock signal, and an input signal;
a second interference cancellation circuit configured for generating a second interference-cancelled signal which is cancelled with a first post cursor component, a second post cursor component, a third post cursor component and a fourth post cursor component, based on the first weight application signal, the second weight application signal, the third weight application signal, the fourth weight application signal, the first sampling output signal, the second sampling output signal, the third sampling output signal, the fourth sampling output signal, a first clock signal, a second clock signal and the input signal;
a first sampling circuit configured for generating the first sampling output signal based on the first interference-cancelled signal and the first clock signal;
a second sampling circuit configured for generating the second sampling output signal based on the first interference-cancelled signal and the second clock signal;
a third sampling circuit configured for generating the third sampling output signal based on the second interference-cancelled signal and the third clock signal; and
a fourth sampling circuit configured for generating the fourth sampling output signal based on the second interference-cancelled signal and the fourth clock signal.

11. The symbol interference cancellation circuit according to claim 10, wherein the first interference cancellation circuit generates the first interference-cancelled signal by cancelling the first post cursor component based on the first weight application signal and the fourth sampling output signal, cancelling the second post cursor component based on the second weight application signal and the second sampling output signal, cancelling the third post cursor component based on the third weight application signal and the third sampling output signal, and cancelling the fourth post cursor component based on the fourth weight application signal and the first sampling output signal, based on the fourth clock signal being at a specified level.

12. The symbol interference cancellation circuit according to claim 11, wherein the first interference cancellation circuit generates the first interference-cancelled signal by cancelling the first post cursor component based on the third weight application signal and the fourth sampling output signal, cancelling the second post cursor component based on the fourth weight application signal and the second sampling output signal, cancelling the third post cursor component based on the first weight application signal and the third sampling output signal and cancelling the fourth post cursor component based on the second weight application signal and the first sampling output signal, based on the third clock signal being at a specified level.

13. The symbol interference cancellation circuit according to claim 12, wherein the second interference cancellation circuit generates the second interference-cancelled signal by cancelling the first post cursor component based on the first weight application signal and the first sampling output signal, cancelling the second post cursor component based on the second weight application signal and the fourth sampling output signal, cancelling the third post cursor component based on the third weight application signal and the second sampling output signal and cancelling the fourth post cursor component based on the fourth weight application signal and the third sampling output signal, based on the first clock signal being at a specified level.

14. The symbol interference cancellation circuit according to claim 13, wherein the second interference cancellation circuit generates the second interference-cancelled signal by cancelling the first post cursor component based on the third weight application signal and the first sampling output signal, cancelling the second post cursor component based on the fourth weight application signal and the fourth sampling output signal, cancelling the third post cursor component based on the first weight application signal and the second sampling output signal and cancelling the fourth post cursor component based on the second weight application signal and the third sampling output signal, based on the second clock signal being at a specified level.

15. The symbol interference cancellation circuit according to claim 10, wherein the first to fourth clock signals are phases which are different from one another.

16. The symbol interference cancellation circuit according to claim 15,
wherein the first and second clock signals have a phase difference of substantially 90 degrees,
wherein the second and third clock signals have a phase difference of substantially 90 degrees, and
wherein the third and fourth clock signals have a phase difference of substantially 90 degrees.

17. A symbol interference cancellation circuit comprising:
an interference cancellation circuit configured for generating an interference-cancelled signal which is cancelled with post cursor components of an input signal, based on different combinations of weight application signals and sampling output signals, when a first clock signal transitions to a first specified level and when a second clock signal transitions to a second specified level,
a first sampling circuit configured for generating a first sampling output signal from the sampling output signals based on a third clock signal and the interference-cancelled signal; and
a second sampling circuit configured for generating a second sampling output signal from the sampling output signals based on a fourth clock signal and the interference-canceled signal.

18. The symbol interference cancellation circuit according to claim 17,
wherein the first sampling circuit is configured for generating the first sampling output signal based on the interference-cancelled signal generated during the transition of the second clock signal to the second specified level, and wherein the second sampling circuit is configured for generating the second sampling output signal based on the interference-cancelled signal generated during the transition of the first clock signal to the first specified level.

* * * * *